J. J. FINNIGAN.
TUBE SETTING.
APPLICATION FILED MAR. 15, 1911.
998,886.
Patented July 25, 1911.
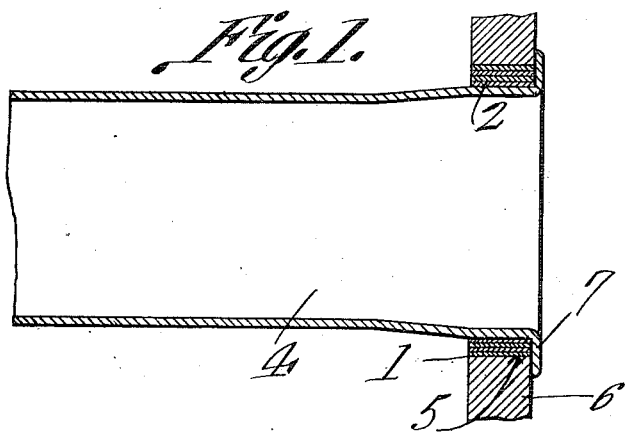
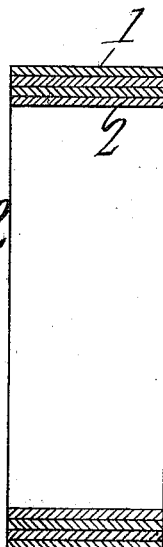
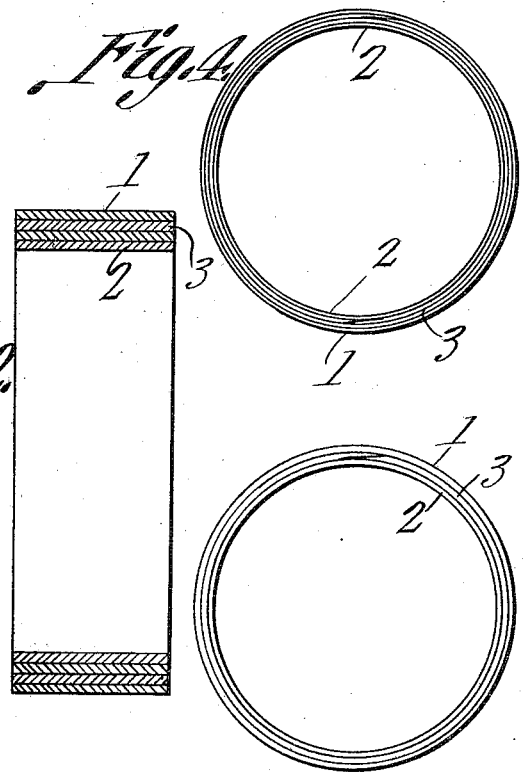
J. J. Finnigan, Inventor
by C. A. Snow & Co.
Attorneys
Witnesses

UNITED STATES PATENT OFFICE.

JOHN JOSEPH FINNIGAN, OF ATLANTA, GEORGIA.

TUBE-SETTING.

998,886.                    Specification of Letters Patent.     Patented July 25, 1911.

Application filed March 15, 1911.   Serial No. 614,641.

*To all whom it may concern:*

Be it known that I, JOHN J. FINNIGAN, a citizen of the United States, residing at Atlanta, in the county of Fulton and State of Georgia, have invented a new and useful Tube-Setting, of which the following is a specification.

This invention has relation to tube settings and it consists in the novel construction and arrangement of its parts as hereinafter described and claimed.

The object of the invention is to provide a setting for tubes adapted to surround the tube and be inserted in the openings in the tube sheets, the said setting being composed of inner and outer rings or ferrules of pliable metal with one or more rings interposed between them, the said innermost rings being of resilient or flexible metal.

By providing a setting as indicated the rings of soft metal have bearing surfaces against the periphery of the tube and the wall of the opening in the tube sheet, while the innermost flexible ring bears against the said pliable ring and will have a tendency to hold the same tightly in place whereby a tight joint is maintained between the flue and flue sheet notwithstanding the contraction and expansion had in the tube when subjected to heat.

In the accompanying drawing,—Figure 1 is a sectional view of a portion of a tube and portion of a tube sheet with the tube setting in place. Fig. 2 is a transverse sectional view of one form of the tube setting. Fig. 3 is a transverse sectional view of another form of the tube setting. Figs. 4 and 5 are edge or face views respectively of the forms of tube setting illustrated in Figs. 2 and 3.

The tube setting consists of an outer ring 1 formed from pliable metal as for instance copper, and an inner ring 2 formed from the same metal. Between the rings 1 and 2 are interposed a ring or rings 3 which are of iron or steel or other metal of spring or resilient nature. A setting thus built up is placed around the ends of each tube 4 and is inserted in the opening 5 in the tube sheet 6. The end of the tube 4 is then expanded and lapped over as at 7 in the usual manner. The tube thus set is free to contract and expand in the usual manner and as it expands and contracts diametrically or circumferentially the soft rings 1 and 2 are held in position by the resilient rings or ring 3. And therefore the joint is insured against leakage for a considerable length of time for the rings of softer metal operate as packings, while the ring or rings of harder resilient metal serve as means for holding the said packings in their proper positions irrespective of the movement of the tube incident to contraction and expansion.

Having described the invention what I claim as new and desire to secure by Letters Patent is:—

1. The combination with an apertured tube sheet, and a tube, of a tube setting, consisting of a series of concentric rings of substantially the width of the metal at the aperture of the sheet, fitting in said aperture about the end of the tube, the rings in contact with the wall of the sheet aperture and the outer circumference of the tube, being of a soft pliable packing metal, and the intermediate ring being of a non-compressible flexible metal.

2. The combination with an apertured tube sheet, of a tube setting comprising a series of concentric rings of substantially the width of the metal at the aperture of the sheet, the ring in contact with the wall of the sheet aperture being of a soft pliable packing metal, and the intermediate ring being of a non-compressible metal, the inner ring being also of a soft pliable packing metal, and a tube fitting within the inner ring thereof and flanged to extend circumferentially over the outer ends of the series of rings and upon the tube sheet about its aperture.

In testimony that I claim the foregoing as my own, I have hereto affixed my signature in the presence of witnesses.

JOHN JOSEPH FINNIGAN.

Witnesses:
  G. H. WITHERS,
  J. ARMSTRONG,
  JAMES N. MOORE.

---

Copies of this patent may be obtained for five cents each, by addressing the "Commissioner of Patents, Washington, D. C."